3,053,813
HEXAMETHYLENEAMIDE, p-XYLYLENEAMIDE COPOLYMERS
Robert D. Evans, West Chester, and Arthur J. Yu, Swarthmore, Pa., assignors to American Viscose Corporation, Philadelphia, Pa., a corporation of Delaware
Filed Apr. 21, 1959, Ser. No. 807,957
6 Claims. (Cl. 260—78)

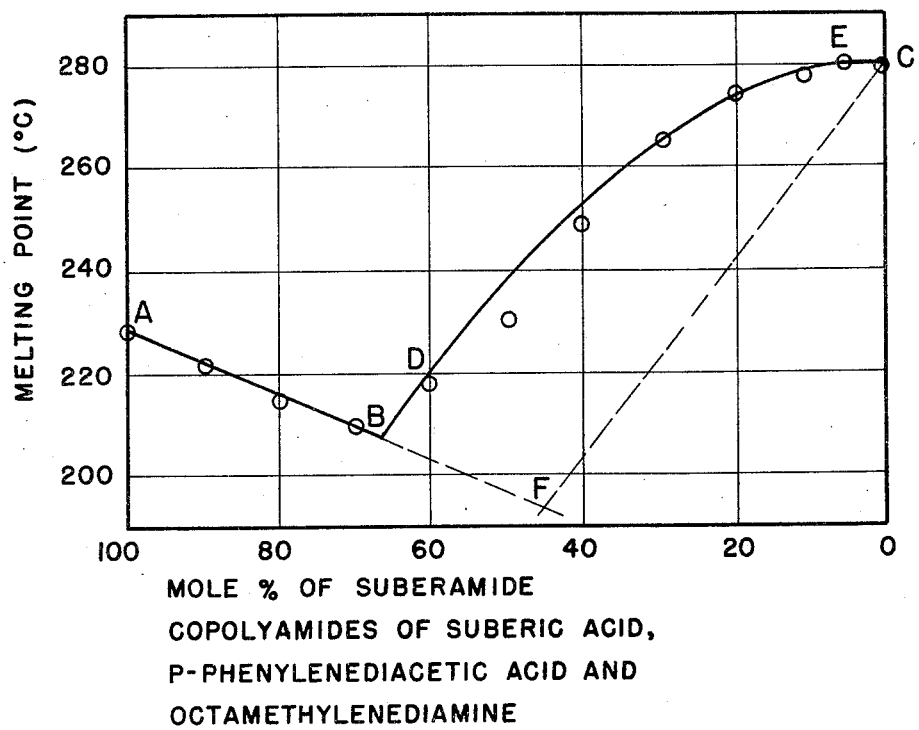

This invention relates to isomorphous copolyamides. More particularly this invention relates to isomorphous copolyamides of certain dicarboxylic acids, hexamethylenediamine and p-xylylenediamine.

As a general rule, if part of the monomer used in making a homopolymer by a condensation reaction is replaced by a second monomer and a copolymer is formed comprising the first and second monomers, the melting point of the copolymer is lower than the melting point of the homopolymer of the first monomer. Also, the softness, flexibility, and solubility of the copolymer is greater. It is believed that the second monomer that is copolymerized interrupts the chain regularity of the first monomer and introduces some longitudinal disorder in the copolymer. As a result the degree of crystallinity of the copolymer is reduced and the polymer is non-isomorphous. A measure or index of the crystallinity of the polymer and whether it is isomorphous or non-isomorphous is the melting point. However, certain monomers can be copolymerized in certain proportions to form isomorphous copolymers. The melting point of the copolymer is either equal to or greater than the melting point of the homopolymer of one of the monomers. The isomorphous copolymer may be considered as a homopolymer that has had a certain proportion of the monomer replaced by a second monomer. If the second monomer is such that it does not disturb the size, shape, geometrical pattern or crystalline lattice of the copolymer the resulting copolymer is isomorphous.

This invention has for its object to provide isomorphous copolymers of certain dicarboxylic acids, hexamethylenediamine and p-xylylenediamine which comprise 60 to 5 mol percent of the hexamethyleneamide and 40 to 95 mol percent of the p-xylyleneamide.

It has now been found in accordance with the present invention that isomorphous copolymers may be made of certain mol proportions of hexamethylenediamine, p-xylylenediamine and either pimelic, azelaic, sebacic, undecanedioic or dodecanedioic acid.

The accompanying drawing is of a chart showing the melting points of isomorphous copolymers embodying this invention and comparing them to melting points of non-isomorphous polymers.

The copolymer of this invention is of high molecular weight and is normally solid. It may be formed into fibers, films, and molded articles.

In making the polymer in general, equal mol proportions of the hexamethylenediamine and the dicarboxylic acid are reacted together to form the corresponding hexamethylenediammonium salt. Likewise, equal mol proportions of the p-xylylenediamine and the same dicarboxylic acid are reacted together to form the corresponding p-xylylenediammonium salt. The salts which are crystalline are separately recovered and are washed and dried. The isomorphous copolymer is formed by condensing together certain mol proportions of the hexamethylenediammonium salt and the p-xylylenediammonium salt. The mol proportions in which the two salts are mixed and reacted together are the mol proportions in which the hexamethyleneamide and the p-xylyleneamide will be present in the resulting isomorphous copolymer. In accordance with this invention the mixture of the salts reacted together is composed of 60 to 5 mol percent hexamethylenediammonium salt and 40 to 95 mol percent of the p-xylylenediammonium salt. The mixed salts are covered with m-cresol and are heated to a high temperature and at reduced pressure until the copolymerization is completed. The water that is formed is distilled off and the m-cresol is then distilled off. The copolymer that is recovered is broken up and is ground to particle size.

The copolymer of this invention may in a sense be considered as a homopolymer of hexamethyleneamide in which part of the hexamethyleneamide has been replaced by the p-xylyleneamide. In making the copolymer of this invention part of the hexamethylenediammonium salt that would be reacted alone if the hexamethyleneamide homopolymer were to be made is replaced by p-xylylenediammonium salt and the two salts are copolymerized together. The acid residue is the same throughout the copolymer while the diamine residue is that of both of the diamines. The copolymer may also be considered as a homopolymer in which the hexamethylenediamine residue is replaced in part by the p-xylylenediamine residue.

In the present invention from 40 to 95 mol percent of the hexamethyleneamide may be replaced by the p-xylyleneamide. The resulting isomorphous copolymer contains the hexamethyleneamide and the p-xylyleneamide in the amount that the hexamethyleneamide has been replaced. The isomorphous copolymer contains 60 to 5 mol percent of the hexamethyleneamide and 40 to 95 mol percent of the p-xylyleneamide. Expressed in another way, of the total amine residue in the copolymer, the hexamethylenediamine residue may be 60 to 5 mol percent and the p-xylylenediamine residue may be 40 to 95 mol percent.

Referring to the chart drawing in which the melting point characteristics of the hexamethylenesebacamide-p-xylylenesebacamide copolymer embodiment is shown. In the chart the melting points of the copolymer are plotted in degrees centigrade along the ordinate line and the mol proportions of the copolymer are plotted along the abscissa. At the extreme left side of the chart the polymer is the homopolymer polyhexamethylenesebacamide. As the chart proceeds to the right the polyhexamethylenesebacamide is replaced more and more by p-xylylenesebacamide in the copolymer until the homopolymer poly-p-xylylenesebacamide is formed. The curve shown by the solid line shows the changes in the melting point of the copolymer as its composition changes from the homopolymer polyhexamethylenesebacamide, through the various changes in the proportions of the composition of the copolymer hexamethylenesebacamide - p - xylylenesebacamide until the homopolymer poly-p-xylylenesebacamide is reached at the far right. The copolymer in the portion of the plotting A, B decreases in melting point as the amount of the other monomer p-xylylenesebacamide that is introduced is increased. This portion of the curve shows that for this range the copolymer is non-isomorphous. As the amount of the monomer p-xylylenesebacamide is further increased the melting point increases as shown by the portion of the curve B, D, E, C. If the copolymer were non-isomorphous through all ranges of its composition it would have a melting point curve such as A, B, F, C. The portion F would be the minimum melting point for a copolymer composed of 60 mol percent hexamethylenesebacamide and 40 mol percent p-xylylenesebacamide. It will be seen from the chart the actual melting points for the copolymer composed of from 60 to 5 mol percent hexamethylenesebacamide and 40 to 95 mol percent p-xylylenesebacamide is the solid line D, E. This is above the line F, C for the non-isomorphous copolymer for all proportions of the composition of the copolymer within these mol percent limits. The melting points of this copolymer in these proportions of the components are all above the melting points for the non-isomorphous copolymer and this copolymer is therefore isomorphous.

In the following example which is illustrative of the invention an isomorphous copolymer of 40 mol percent hexamethylenesebacamide and 60 mol percent of p-xylylenesebacamide is formed.

*Example*

Quantities of hexamethylenediammonium sebacate and p-xylylenediammonium sebacate are each formed by reacting equal mol proportions of the respective diamine with sebacic acid. The two diammonium salts are separately weighed and thoroughly mixed together in such proportions to form a mixture containing 40 mol percent hexamethylenediammonium sebacate and 60 mol percent p-xylylenediammonium sebacate. The mixture is transferred to a reaction vessel and enough m-cresol is added to cover the reactants. The reaction vessel is immersed in a silicone oil bath and the heating is started.

The heating cycle consists of four stages. (a) Heating at around 100° until a homogeneous solution is obtained. This takes about 15 to 30 minutes. (b) Raise the temperature gradually to 160–180° C. Water begins to distill over at this stage. The solution becomes more and more viscous and gradually turns opaque. This usually takes place after one to two hours. (c) Before the solution solidifies, temperature is raised to 230°–260° to keep the copolymer solution in a molten state. The pressure is gradually reduced to remove the m-cresol by distillation. As more and more m-cresol is removed, the copolymer turns opaque and is about to solidify. (d) The pressure is reduced to below 0.5 mm. and the temperature is raised to 280°–320°, depending on the melting point of the polymer. These conditions are maintained for four hours. At this stage, the last trace of m-cresol is removed, and the copolymerization is nearly driven to completion.

At the end of copolymerization, the heating is discontinued, the evacuation stopped, and nitrogen is admitted to the system. The copolymer in the reaction flask is allowed to cool in the oil bath. This slow rate of cooling gives a well annealed copolymer, which does not adhere to the wall of the vessel. The glass vessel is then removed from the oil bath, and broken to remove the copolymer. The copolymer is chipped to small pieces, which are ground in a small Wiley mill, using a 20 mesh screen.

The determination of copolymer melting point is made by observing particles of the copolymer between crossed polarizers on the hot stage of a microscope. The melting point is taken as the temperature at which the last trace of crystallinity, as evidenced by birefringence, completely disappeared.

The hexamethylenesebacamide - p - xylylenesebacamide copolymer that is formed is composed of 40 mol percent hexamethylenesebacamide and 60 mol percent p-xylylenesebacamide. The melting point of the resulting polymer is approximately 252° C.

In a similar manner the hexamethylenediammonium sebacate and the p-xylylenediammonium salt may be mixed and reacted together in various proportions from 60 to 5 mol percent of the hexamethylenediammonium salt and 40 to 95 mol percent of the p-xylylenediammonium salt. Likewise, the respective diammonium salts of the other dicarboxylic acids may be formed and reacted together to produce other embodiments of the invention.

We claim:

1. A copolymer of hexamethylenediamine, p-xylylenediamine and dicarboxylic acid selected from the group consisting of pimelic, azelaic, sebacic, undecanedioic and dodecanedioic, the copolymer being composed of 60 to 5 mol percent of the hexamethyleneamide and 40 to 95 mol percent of the p-xylyleneamide.

2. A copolymer of 60 to 5 mol percent hexamethylenepimelamide and 40 to 95 mol percent p-xylylenepimelamide.

3. A copolymer of 60 to 5 mol percent hexamethyleneazelamide and 40 to 95 mol percent p-xylyleneazelamide.

4. A copolymer of 60 to 5 mol percent hexamethylenesebacamide and 40 to 95 mol percent p-xylylenesebacamide.

5. A copolymer of 60 to 5 mol percent hexamethyleneundecanediamide and 40 to 95 mol percent p-xylyleneundecanediamide.

6. A copolymer of 60 to 5 mol percent hexamethylenedodecanediamide and 40 to 95 mol percent p-xylylenedodecanediamide.

References Cited in the file of this patent

UNITED STATES PATENTS 2,190,770     Carothers _____ Feb. 20, 1940

OTHER REFERENCES

Polyamide Resins, Floyd Reinhold Plastics Applications Series, 1958, New York, pages 21–24 relied on. (Copy in Scientific Library.)